US012463384B2

(12) United States Patent
Zhu et al.

(10) Patent No.: US 12,463,384 B2
(45) Date of Patent: Nov. 4, 2025

(54) ELECTRICAL CONNECTOR WITH THREE METAL SHELLS JOINED TOGETHER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Jian-Kuang Zhu, Kunshan (CN); Dan Qu, Kunshan (CN); Hong-Wei Liu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 393 days.

(21) Appl. No.: 18/062,178

(22) Filed: Dec. 6, 2022

(65) Prior Publication Data

US 2023/0178938 A1 Jun. 8, 2023

(30) Foreign Application Priority Data

Dec. 7, 2021 (CN) ......................... 202123051242.8

(51) Int. Cl.

| | |
|---|---|
| ***H01R 13/6582*** | (2011.01) |
| ***H01R 12/70*** | (2011.01) |
| ***H01R 13/115*** | (2006.01) |
| ***H01R 13/40*** | (2006.01) |
| ***H01R 13/516*** | (2006.01) |

(52) U.S. Cl.
CPC ..... *H01R 13/6582* (2013.01); *H01R 12/7005* (2013.01); *H01R 13/115* (2013.01); *H01R 13/40* (2013.01); *H01R 13/516* (2013.01)

(58) Field of Classification Search
CPC ............ H01R 13/6582; H01R 12/7005; H01R 13/115; H01R 13/40; H01R 13/516; H01R 13/26; H01R 24/60; H01R 13/6593
See application file for complete search history.

(56) References Cited

U.S. PATENT DOCUMENTS 6,146,205 A * 11/2000 Lai .................... H01R 13/6582 439/607.41
7,651,379 B1 * 1/2010 Wu ...................... H01R 13/514 439/497
9,653,849 B2 5/2017 Hsu et al.
10,103,501 B2 10/2018 Lin et al.
(Continued)

*Primary Examiner* — Truc T Nguyen
(74) *Attorney, Agent, or Firm* — Ming Chieh Chang

(57) ABSTRACT

An electrical connector includes: an insulative housing; two rows of contacts retained in the insulative housing, each contact having an elastic arm and a soldering tail; a shielding assembly retained in the insulative housing and located between the two rows of contacts; plural cables having front ends connected with the soldering tails of corresponding contacts; a first shell covering the insulative housing; and a second shell and a third shell, wherein the second shell has a pair of side frame portions located by end faces of the insulative housing and a rear plate, the third shell has a front frame portion and a rear plate, and the front frame portion and the rear plate of the third shell and the rear plate of the second shell together entirely enclose and shield the soldering tails of the contacts and the front ends of the cables.

10 Claims, 11 Drawing Sheets

(56) References Cited

U.S. PATENT DOCUMENTS

| | | | | |
|---|---|---|---|---|
| 10,153,596 | B2 * | 12/2018 | Lin | H01R 13/6582 |
| 10,490,948 | B2 * | 11/2019 | Wu | H01R 24/30 |
| 10,553,994 | B2 | 2/2020 | Zhao et al. | |
| 11,056,837 | B2 * | 7/2021 | Wu | H01R 13/6582 |
| 11,081,842 | B2 * | 8/2021 | Wu | H01R 13/6582 |
| 2010/0151731 | A1 * | 6/2010 | Su | H01R 12/52<br>439/607.35 |
| 2012/0099823 | A1 * | 4/2012 | Wu | G02B 6/3817<br>385/88 |
| 2015/0357770 | A1 * | 12/2015 | Xing | H01R 13/504<br>29/879 |
| 2017/0194754 | A1 * | 7/2017 | Tsai | H01R 13/502 |
| 2018/0013239 | A1 * | 1/2018 | Maesoba | H01R 13/648 |
| 2018/0166812 | A1 * | 6/2018 | Lin | H01R 12/75 |
| 2019/0252833 | A1 * | 8/2019 | Li | H01R 13/652 |
| 2023/0178938 | A1 * | 6/2023 | Zhu | H01R 13/115<br>439/607.01 |
| 2023/0369784 | A1 * | 11/2023 | Hamner | H01R 12/722 |

* cited by examiner

ELECTRICAL CONNECTOR WITH THREE METAL SHELLS JOINED TOGETHER

BACKGROUND OF THE INVENTION

1. Field of the Invention

The present disclosure relates to an electrical connector, and particularly to an electrical connector equipped with three metallic shells covering opposite upper and lower surfaces of an housing.

2. Description of Related Arts

U.S. Pat. No. 10,153,596 discloses an electrical connector which includes an insulative housing, a plurality of conductive terminals retained in the insulative housing and a metal shell enclosing the insulative housing. The insulative housing defines an upper sidewall, a lower sidewall and two end walls connected to both ends of the upper and lower sidewalls commonly defining a mating cavity. The metal shell includes an upper shell and a lower shell engaged with each other and a rear shell. A pair of magnetic elements is located between the upper and lower shells. The rear shell is electrically connected to the upper shell. Because the rear shell and lower shell are essentially separated from each other, a mechanical securing effect and an electrical grounding effect are not good enough.

U.S. Pat. No. 10,553,994 discloses an electrical connector including a front and rear shielding shells enclosing a housing thereof, wherein the rear shielding shell has an intermediate part, a front part continuing the intermediate part, a pair of side parts continuing the intermediate part, and a rear part continuing the intermediate part, or the rear shielding shell forwardly abuts the front shielding shell.

SUMMARY OF THE INVENTION

The instant invention is to provide an electrical connector with better electrical grounding effect.

To achieve the above-mentioned object, an electrical connector comprises: an insulative housing defining two opposite side faces, two opposite end faces, and a mating cavity opening forwards in a front-back direction; two rows of contacts retained in the insulative housing and located at opposite sides of the mating cavity in a vertical direction perpendicular to the front-back direction, each contact comprising an elastic arm extending into the mating cavity and a soldering tail extending out of the insulative housing; a shielding assembly retained in the insulative housing and located between the two rows of contacts; a plurality of cables having front ends connected with the soldering tails of corresponding contacts; a first shell covering the side faces and the end faces of the insulative housing; and a second shell and a third shell, wherein the second shell comprises a pair of side frame portions located by the end faces of the insulative housing and a rear plate, the third shell comprises a front frame portion and a rear plate, and the front frame portion and the rear plate of the third shell and the rear plate of the second shell together entirely enclose and shield the soldering tails of the contacts and the front ends of the cables.

Other advantages and novel features of the invention will become more apparent from the following detailed description of the present embodiment when taken in conjunction with the accompanying drawings.

DETAILED DESCRIPTION OF THE PREFERRED EMBODIMENTS

Figure 1:
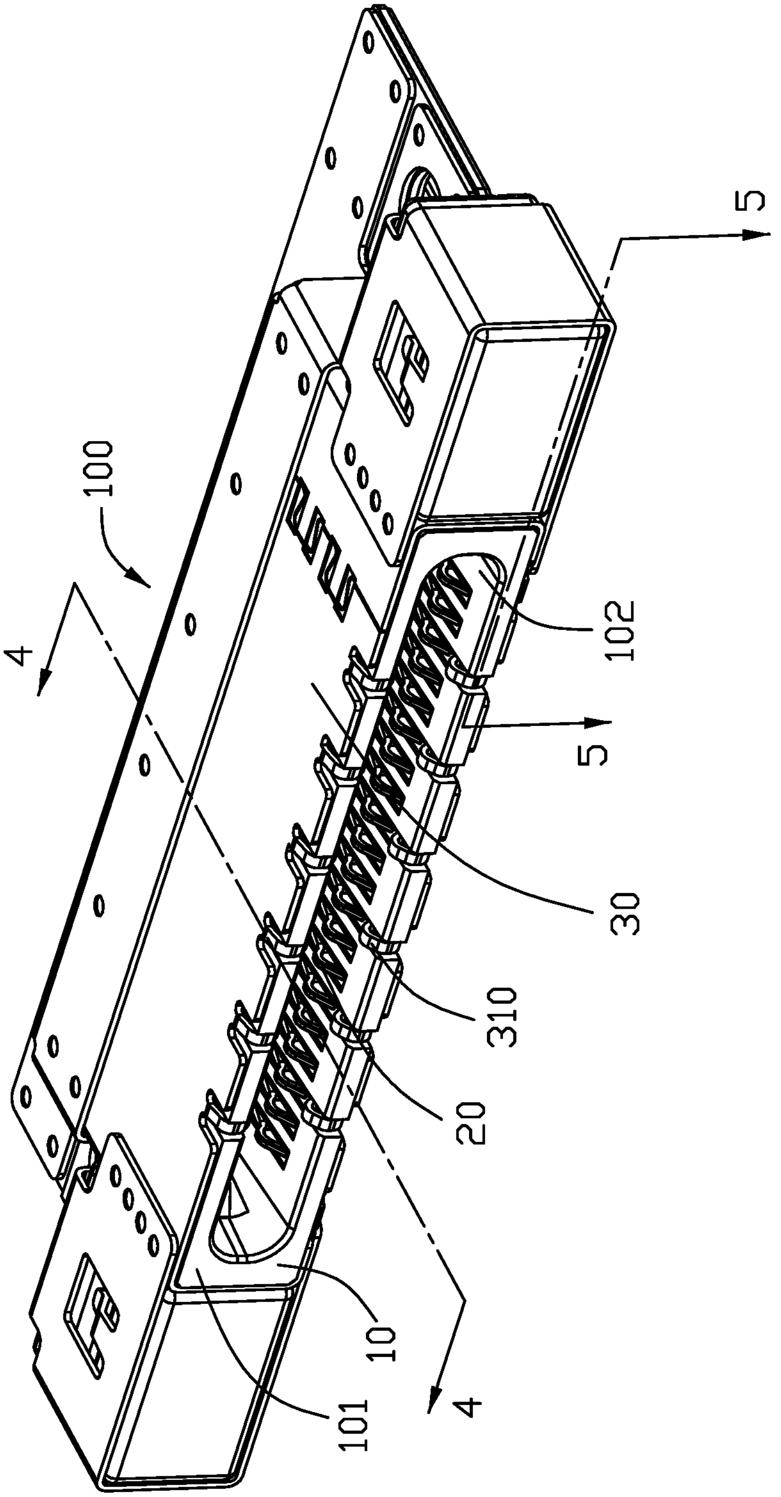
FIG. 1 is a perspective view of an electrical connector of this present invention.

Referring to FIGS. 1-6 illustrating an electrical connector 100 of this present invention, the electrical connector 100 includes an insulative housing 10, a plurality of conductive contacts 20 retained in the insulative housing, a plurality of cables 70 connecting to the contacts 20. The insulative housing 10 defines a mating cavity 102 to receive a mating connector. The electrical connector 100 further includes a first shell 30 surrounding the insulative housing 10, a second shell 50 and a third shell 60 which are welded to a rear end of the first shell 30. Each contact 20 comprises a soldering tail 23 connecting to the cable 70. The second and third shells 50, 60 cooperate to form a shielding space to cover the junction of the cables and the soldering tails.

Referring to FIGS. 1 and 9-11, the insulative housing 10 includes a top wall 11, a bottom wall 14 opposite to the top wall 11 and a pair of end walls 15 connecting the top and bottom walls. The top and bottom walls 11, 14 have two opposite side faces, and the pair of end walls 15 has two opposite end faces. The mating cavity 102 is located between the top and bottom walls, and extends forwards through a front face 101 of the insulative housing 10 along a front-back direction. The insulative housing 10 defines a mounting cavity 104 extending rearwards through a rear end thereof. The end wall 15 extends rearwards through the rear end of the insulative housing 10 to define a mounting slit 103. The top and bottom walls are connected at front ends by the end walls 15.

The plurality of the contacts 20 are arranged in two rows, and retained in the top and bottom walls respectively. Each row of the contacts includes grounding contacts 20G and signal contacts 20S. The insulative housing 10 defines a plurality of terminal passageways to receive the contacts 20. Each contact 20 comprises an elastic arm 21 extending into the mating cavity 102, a fixing portion 22 fixed to the terminal passageway and the soldering tail 23 extending rearwards out of the insulative housing 10. The elastic arm 21 has a contact portion 210 at a free end thereof. The contact portion 210 is exposed upon a groove 111 extending through the top and bottom wall in a vertical direction. The grooves 111 corresponding to the grounding contacts 20G extend forwards through the front face 101 to form a slit 110. The contact portion 210 of the ground contact 20G is located in the corresponding slit 110. The soldering tail 23 includes a vertical portion 231 connecting the fixing portion 22 and a soldering portion 232 perpendicular to the vertical portion 231.

Figure 3:
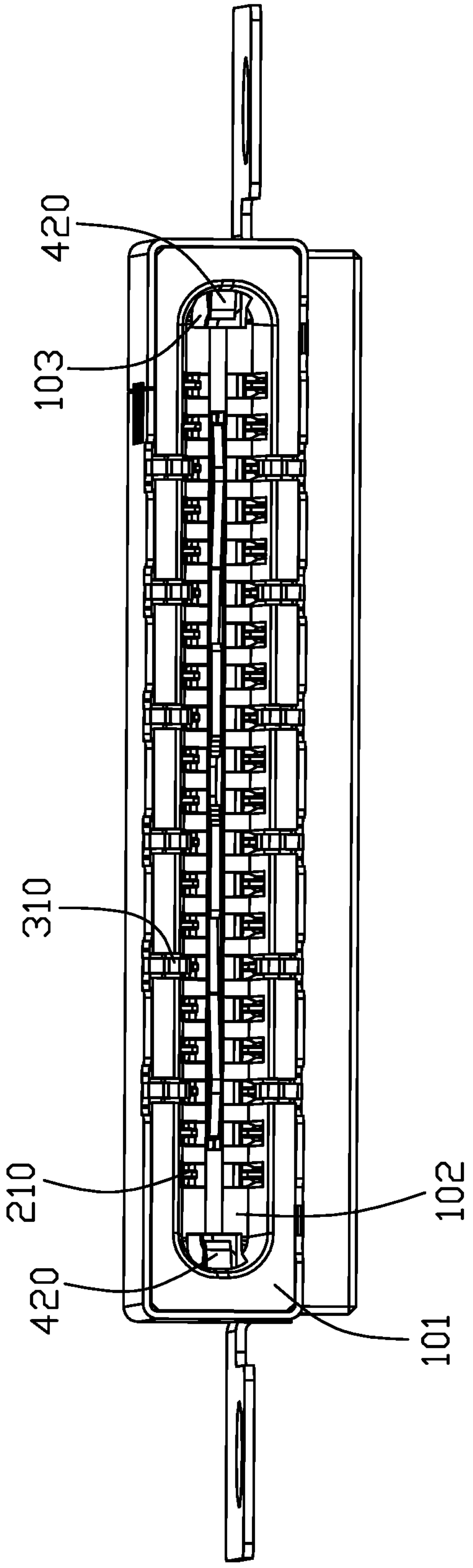
FIG. 3 is a front elevational view of the electrical connector of FIG. 1.

The first shell 30 surrounds the insulative housing 10, the first shell 30 includes a top plate 31 attached to the top wall 11, a bottom plate 33 attached to the bottom wall 14, and a pair of end plate 32 connecting the top and bottom plates. The end plates 32 cover the end walls 15 of the insulative housing 10. The top and bottom plates extend forwards to cover the grooves 111 and define a plurality of notches 311 at front ends thereof to surround the corresponding slits 110. An elastic finger 310 extends from the notch 311 and fold inwards. The elastic finger 310 passes through the slit 110 into the mating cavity 102 to contact with a metal shell of the mating connector. The elastic fingers 310 hind in the notches 311, and are located behind the front face 101 and in front of the corresponding grounding contacts 20G As shown in FIG. 3, a width of the elastic finger 310 is larger than a width of the contact portion 210 along a horizontal direction.

Figure 9:
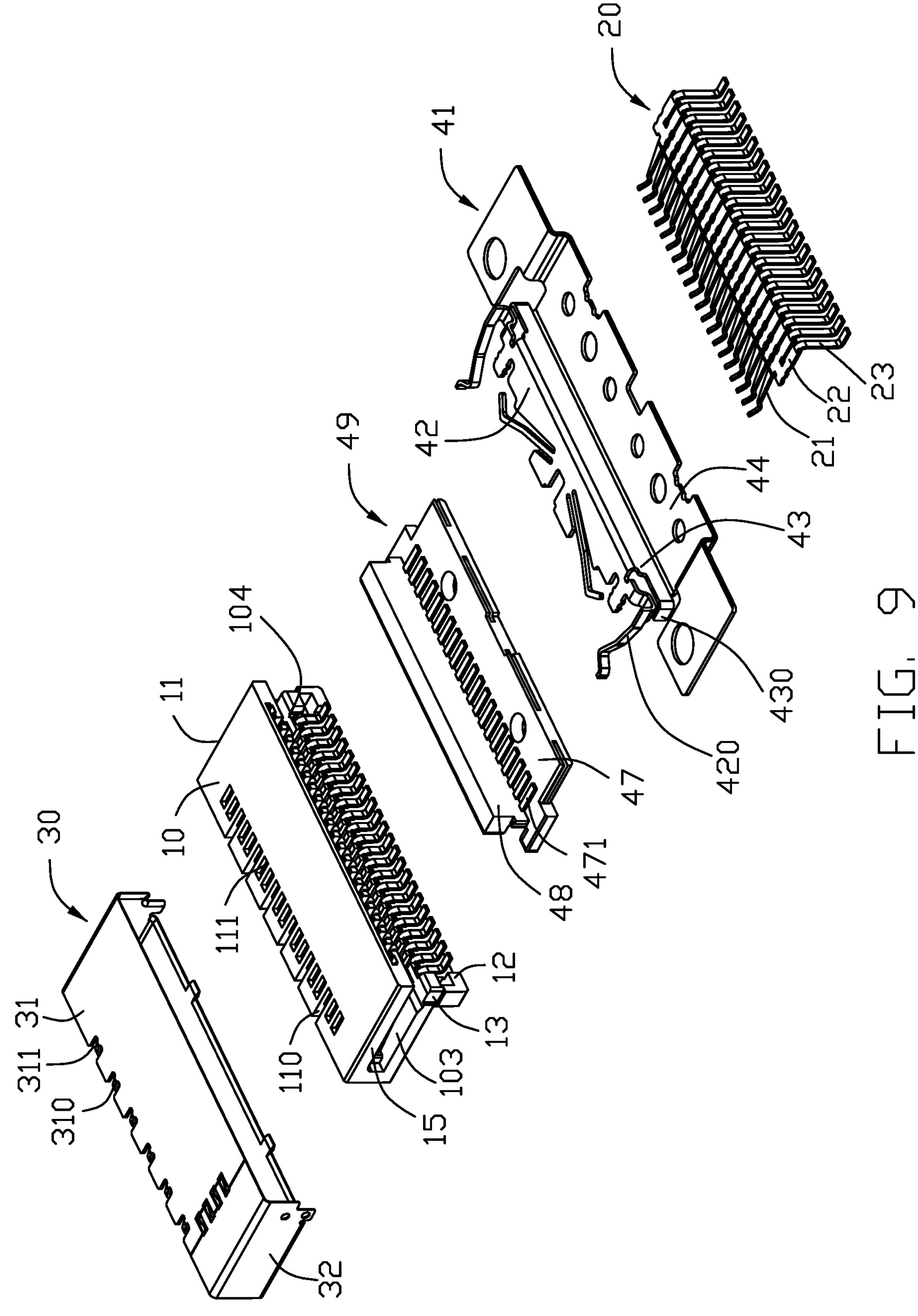
FIG. 9 is a further exploded perspective view of the insulative housing of FIG. 7.
Figure 10:
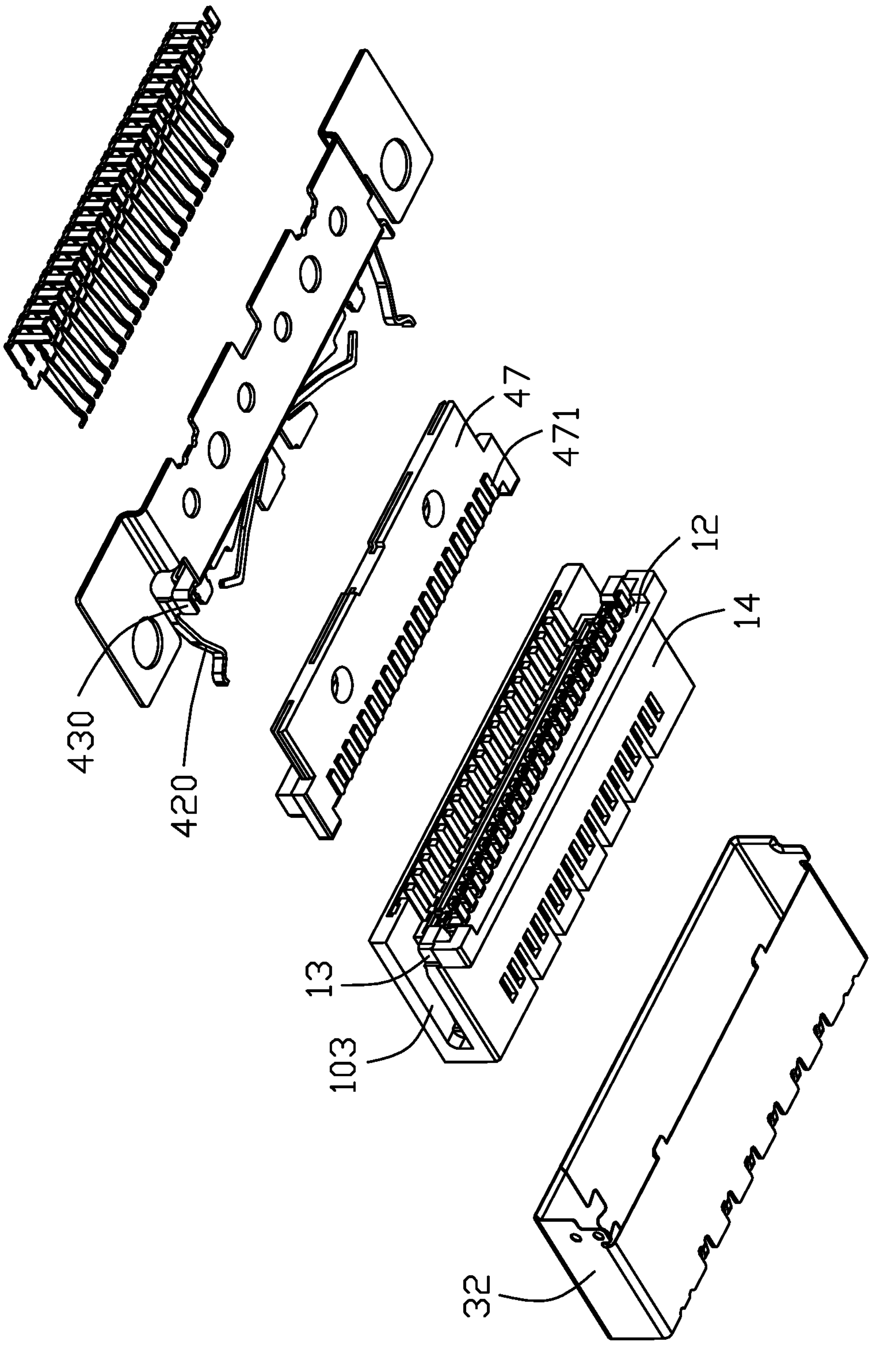
FIG. 10 is another perspective view of the insulative housing of FIG. 9.
Figure 11:
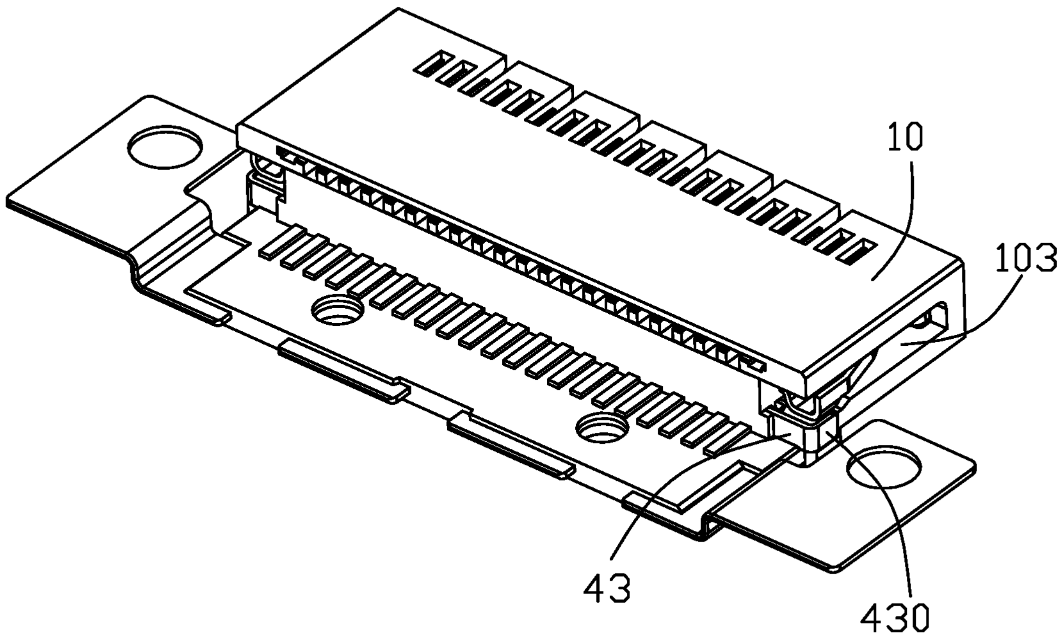
FIG. 11 is a perspective view of the insulative housing of FIG. 7, wherein the first shell is removed.

Referring to FIGS. 9-10, the electrical connector 100 includes a shielding assembly 40 retained in the mounting cavity 104 at the rear end of the insulative housing 10. The shielding assembly 40 includes a metal shielding member 41 and a fixing block 49 integrally injection-molded with the metal shielding member 41. The metal shielding member 41 is located between the two rows of contacts 20, and includes a front main portion 42 retained in the insulative housing 10, a rear horizontal portion 44 parallel to the main portion 42 and a middle vertical connecting portion 43 connecting between the main portion 42 and the horizontal portion 44. The connecting portion 43 and the horizontal portion 44 are embedded within the fixing block 49. The main portion 42 includes a pair of end arms 420 extending forwards from both end edges thereof, and the connecting portion 43 includes a pair of soldering plates 430 extending forwards from both end edges thereof. The soldering plate 430 is located below the end arm 420 in the vertical direction. The insulative housing 10 defines the pair of mounting slits 103 located on both ends of the mating cavity 102. Each mounting slits 103 extends rearwards through the rear end and outwards through an end face of the insulative housing 10. A front part of the mounting slit 103 connects with the mating cavity 102 and a rear part thereof connects with the mounting cavity 104. The insulative housing 10 has a vertical wall 12 extending from the rear end of the bottom wall 14. Each end wall 15 defines a pair of recesses 13 on both end faces thereof. The end arm 420 is arranged in the mounting slit 103 and bends inwards into the mating cavity 102. The soldering plate 430 is located at the recess 13. Referring to FIG. 11, the soldering plate 430 is further attached to the first shell 30. The soldering plate 430 is sandwiched between the end plate 32 and the end wall 11. The soldering plate 430 and the end plate 32 are connected by spot welding.

Figure 4:
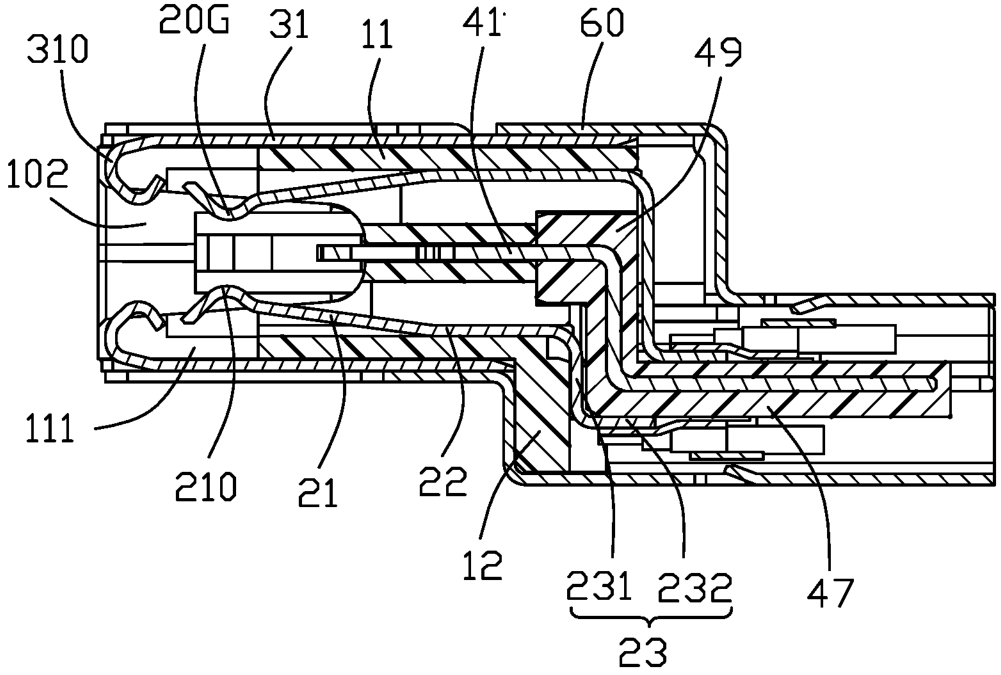
FIG. 4 is a cross-sectional view of the electrical connector of FIG. 1 taken along lines 4-4.
Figure 5:
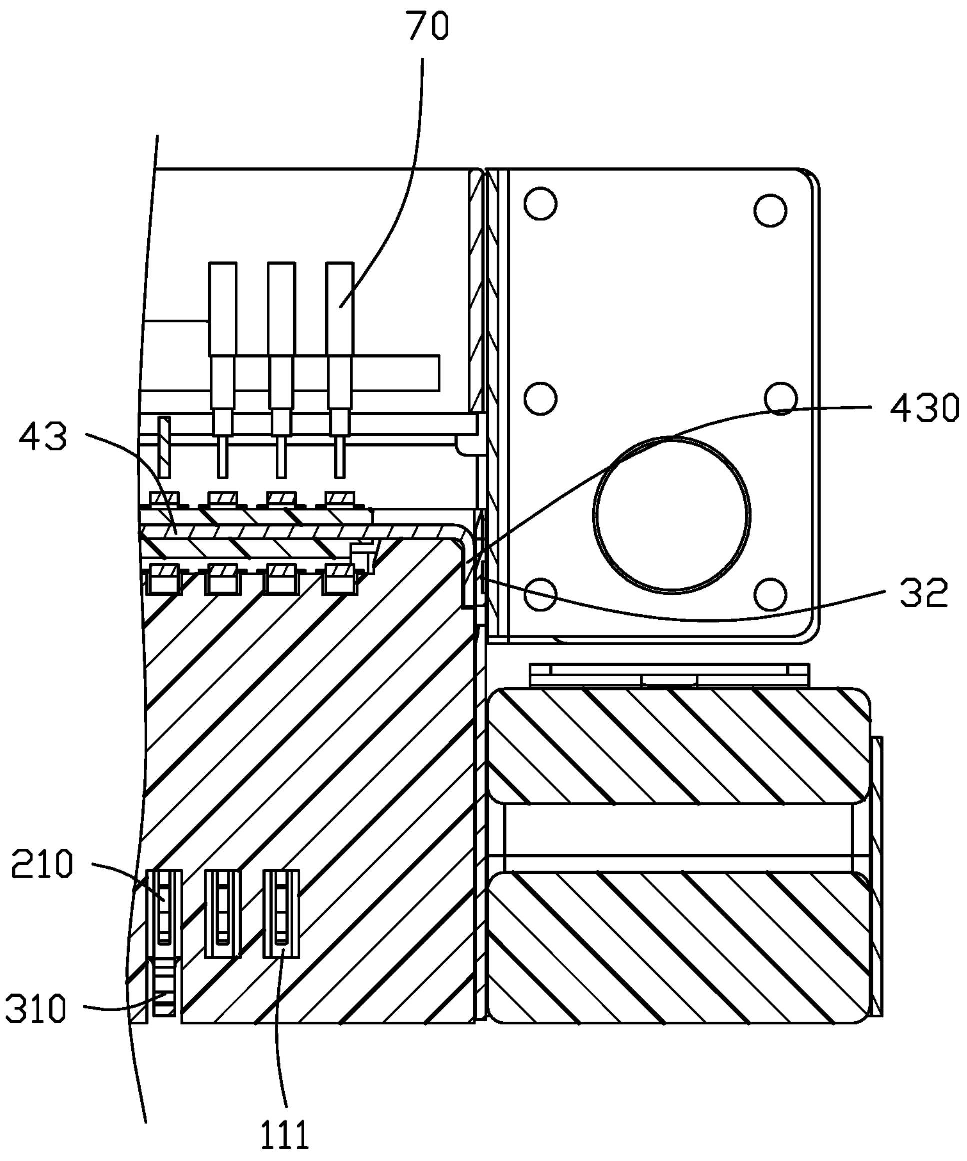
FIG. 5 is a cross-sectional elevational view of part of the electrical connector of FIG. 1 taken along lines 5-5.

The fixing block 49 includes a front horizontal part 47 and a rear vertical part 48. The connecting portion 43 is buried in the vertical part 48, and the horizontal portion 44 is buried in the horizontal part 47. The contacts 20 of the lower row are inserted into the insulative housing 10, then the shielding assembly 40 is inserted into the insulative housing 10. Finally, the contacts 20 of the upper row are inserted into the insulative housing 10. The vertical part 48 covers the rear end of the housing 10. As shown in FIG. 4, the vertical portions 231 and the solder tails of the two rows of contacts are located at opposite sides of the vertical part 48 and the horizontal part 47. A plurality of projections 471 is disposed at each face of the horizontal part 47 in the vertical direction. The vertical portions 231 of the lower row are sandwiched between the vertical wall 12 and the vertical part 48. The soldering portions 232 of the lower row are disposed to a bottom face of the horizontal part 47. Each soldering portion 232 is located between two adjacent projections 471 on the horizontal part 47.

Figure 2:
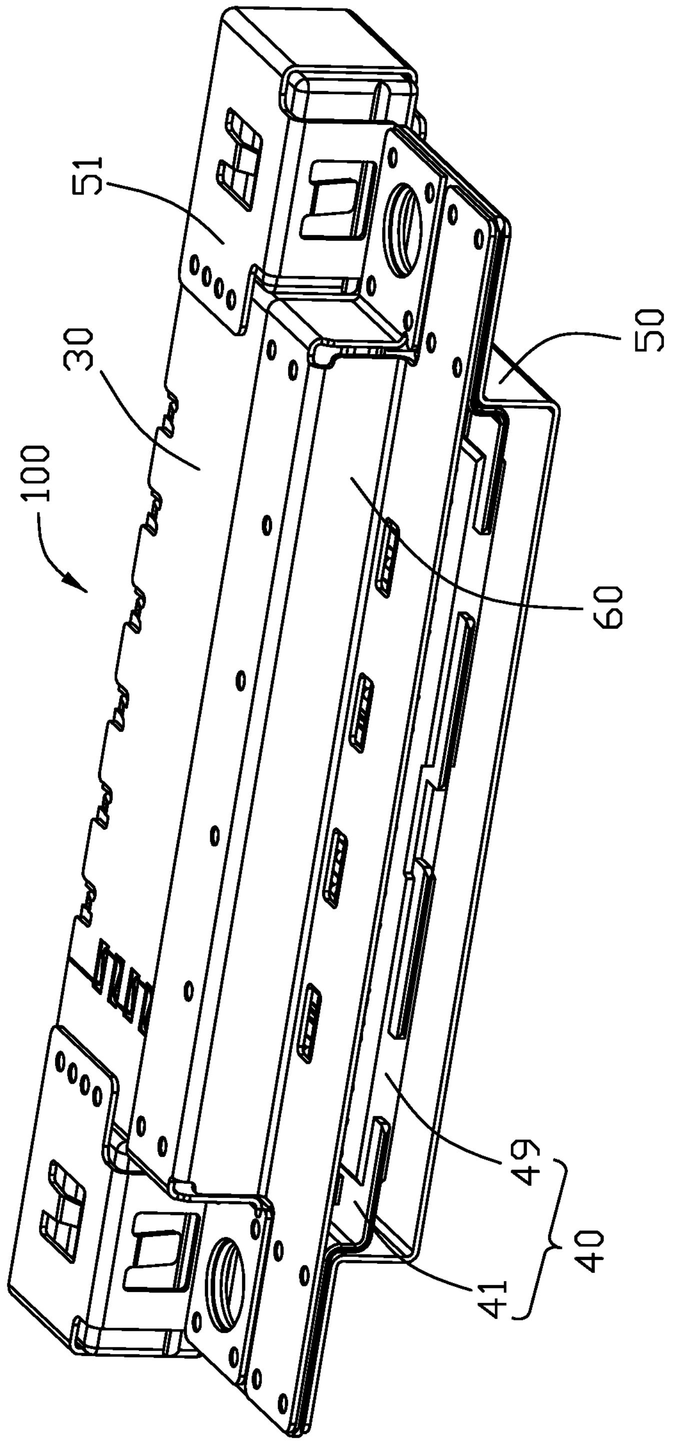
FIG. 2 is another perspective view of an electrical connector of FIG. 2.
Figure 6:
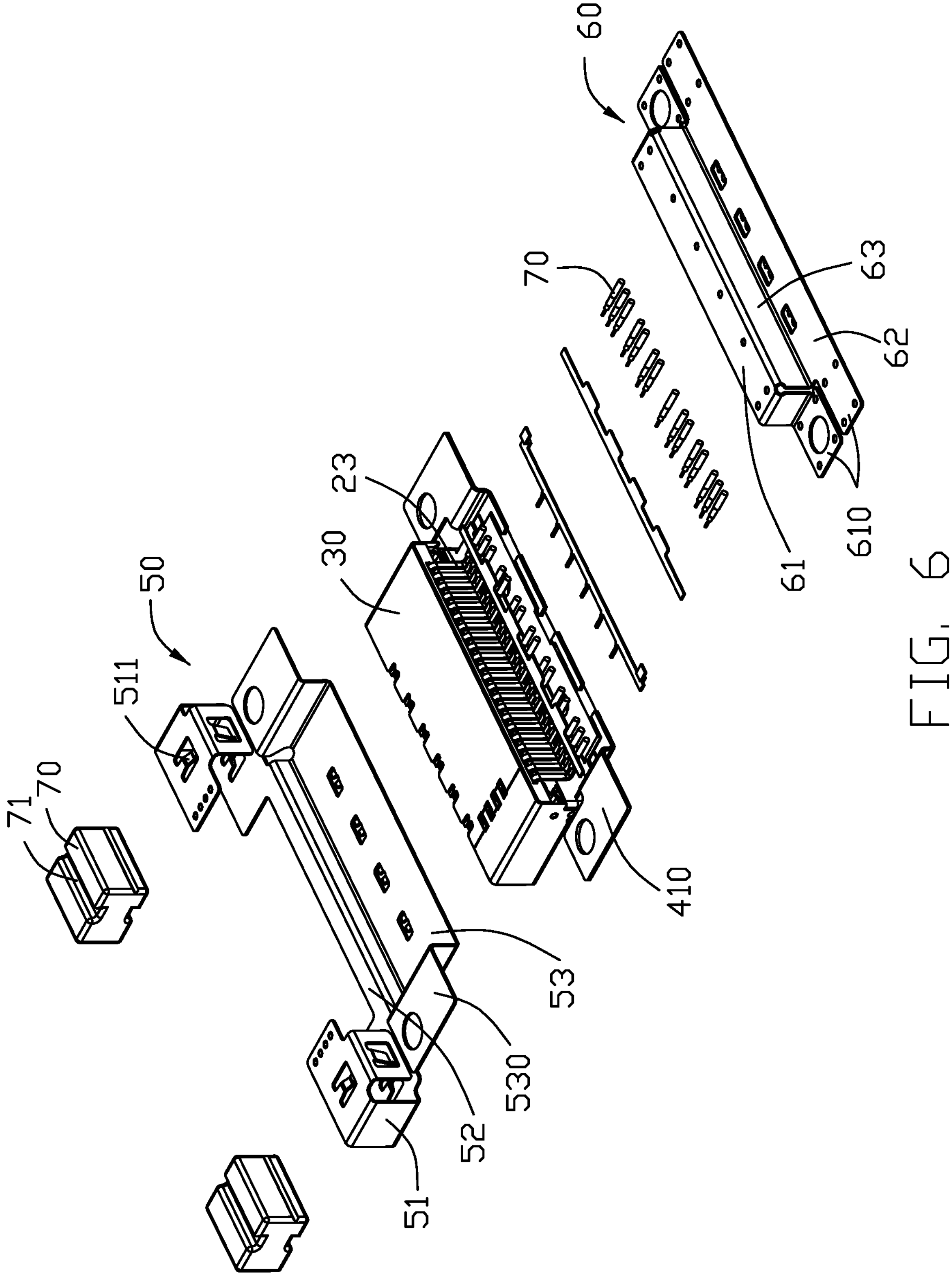
FIG. 6 is an exploded perspective view of the electrical connector of FIG. 2.
Figure 7:
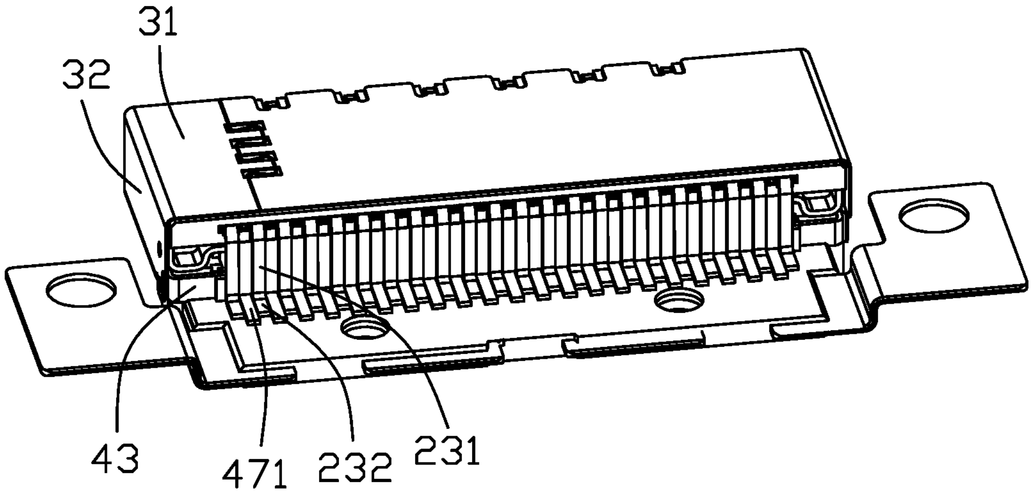
FIG. 7 is a perspective view of the insulative housing of FIG. 6.
Figure 8:
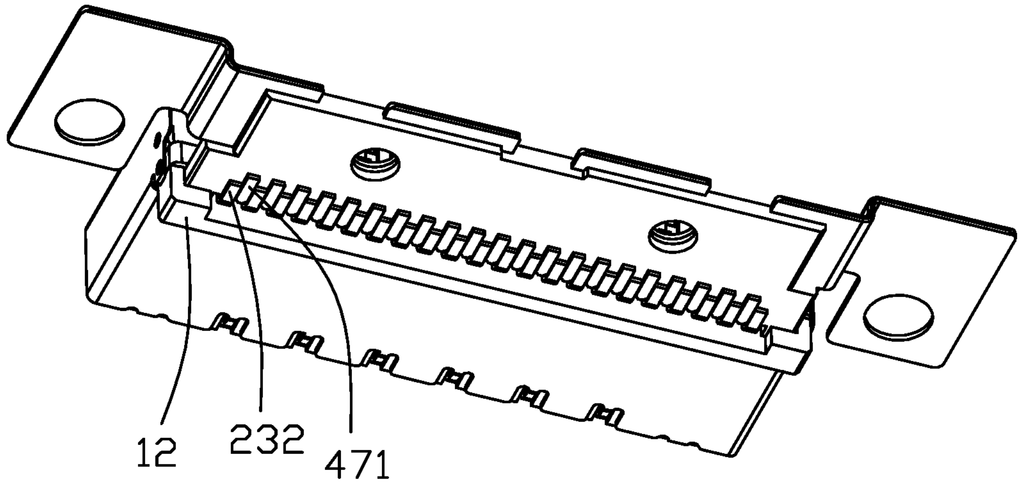
FIG. 8 is another perspective view of the insulative housing of FIG. 7.

Referring to FIG. 6, the electrical connector 100 further includes a pair of magnetic members 70 located at both ends of the insulative housing 10. The second shell 50 includes a frame portion 51 to receive the magnetic members 70. The frame portion 51 extends and overlaps with the top plate 31 of the first shell 30, and the overlapping area of the frame portion 51 and the top plate 31 is fixed by spot welding. Referring to FIG. 1, the frame portion 51 includes an elastic arm 511, the elastic arm 511 abuts against in a groove 71 defined in the magnetic member 70. The front end of the third shell 60 and the rear end of the bottom plate 33 are overlapped and fixed by spot welding at overlapping areas thereof as shown in FIG. 2. The fixing block 49 of the shielding assembly 40 is inserted into the rear end of the insulative housing 10 along the front-rear direction. The second shell 50 and the third shell 60 cover the rear area of the electrical connector where the cables are connected with the soldering portions 232 from above and below, respectively. The second shell 50 and the third shell 60 extend rearwards to beyond the rear end of the horizontal part 47, so as to improve the high frequency effect. The second shell 50 includes a first front plate 52 and a first rear plate 53, the frame portion 51 is located at both ends in front of the first front plate portion 52. The frame portion 51 and the corresponding end plate 32 form a magnetic element receiving cavity to receive the magnetic members 70. The first front plate 52 covers the rear end of the first shell 30, and the first rear plate 53 extends rearwards to cover the end of the shielding assembly 40. The third shell 60 includes a second front plate 61, a second rear plate 62 and a second connecting portion 63 connecting the second front plate 61 and the second rear plate 62. The second front plate 61 and the second connecting portion 63 commonly defines a front frame portion of the third shell. The second front plate 61 is located at the rear end of the insulative housing, and behind the frame portion 51. The second rear plate 62 also covers the end of the shielding assembly 40. The second shell, the third shell and the metal shielding member have wings 530, 610, 410 which are stacked on each other and fixed together by spot welding.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:

an insulative housing defining two opposite side faces, two opposite end faces, and a mating cavity opening forwards in a front-back direction;

two rows of contacts retained in the insulative housing and located at opposite sides of the mating cavity in a vertical direction perpendicular to the front-back direction, each contact comprising an elastic arm extending into the mating cavity and a soldering tail extending out of the insulative housing, each of the soldering tails of the two rows of contacts having a vertical portion;

a shielding assembly retained in the insulative housing and located between the two rows of contacts;

a plurality of cables having front ends connected with the soldering tails of corresponding contacts;

a first shell covering the side faces and the end faces of the insulative housing, the first shell comprising a top plate, a bottom plate, and a pair of end plates connecting the top and bottom plates; and a second shell and a third shell, the second shell comprising a front plate overlapping with the bottom plate of the first shell;

wherein the second shell comprises a pair of side frame portions located by the end faces of the insulative housing and a rear plate, the third shell comprises a front frame portion and a rear plate, and the front frame portion and the rear plate of the third shell and the rear plate of the second shell together entirely enclose and shield the soldering tails of the contacts and the front ends of the cables.

2. The electrical connector as claimed in claim 1, wherein the shielding assembly comprises a rear horizontal portion between the soldering tails of the two rows of contacts.

3. The electrical connector as claimed in claim 2, wherein the shielding assembly comprises a metal shielding member and an insulative fixing block integrally injection-molded with a rear part of the metal shielding member, and the two rows of the soldering tail are located at upper and lower surfaces of the fixing block respectively.

4. The electrical connector as claimed in claim 1, wherein the side frame portions of the second shell and corresponding end plates of the first shell commonly defines a pair of magnetic element receiving cavities.

5. The electrical connector as claimed in claim 4, wherein the front frame portion of the third shell overlaps with the top plate of the first shell.

6. The electrical connector as claimed in claim 1, wherein the side frame portions of the second shell overlap with the first shell and is welded with the first shell by spot welding.

7. The electrical connector as claimed in claim 1, wherein the second shell and the third shell cover a rear end of the shielding assembly in an upper-lower direction.

8. The electrical connector as claimed in claim 7, wherein the fixing block comprises a vertical part and a horizontal part perpendicular to each other, the horizontal part has a plurality of projections at the upper and lower surfaces thereof, and each soldering tail is located between two adjacent protrusions.

9. The electrical connector as claimed in claim 3, wherein the second shell and the third shell and the shielding member each have a pair of wings stacked with each other and fixed together by spot welding, and the wings are located behind the side frame portions of the second shell.

10. The electrical connector as claimed in claim 1, wherein the front frame portion of the third shell surrounds the vertical portions of the soldering tails of an upper row of the two rows of contacts.

* * * * *